(12) United States Patent
Wu

(10) Patent No.: US 12,210,874 B2
(45) Date of Patent: Jan. 28, 2025

(54) PROCESSING FOR VECTOR LOAD OR STORE MICRO-OPERATION WITH INACTIVE MASK ELEMENTS

(71) Applicant: SiFive, Inc., San Mateo, CA (US)

(72) Inventor: Yueh Chi Wu, Taichung (TW)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/335,412

(22) Filed: Jun. 15, 2023

(65) Prior Publication Data

US 2024/0220250 A1    Jul. 4, 2024

Related U.S. Application Data

(60) Provisional application No. 63/435,588, filed on Dec. 28, 2022.

(51) Int. Cl.
G06F 9/30 (2018.01)
(52) U.S. Cl.
CPC .................. *G06F 9/30036* (2013.01)
(58) Field of Classification Search
None
See application file for complete search history.

(56) References Cited

U.S. PATENT DOCUMENTS

2019/0278577 A1* 9/2019 Plotnikov ............... G06F 8/452

* cited by examiner

*Primary Examiner* — Scott C Sun
(74) *Attorney, Agent, or Firm* — Kilpatrick Townsend & Stockton LLP

(57) ABSTRACT

Apparatus and methods for processing of a vector load or store micro-operation with mask information as a no-operation (no-op) when a mask vector for the vector load or store micro-operation has all inactive mask elements or processing vector load or store sub-micro-operation(s) with active mask element(s) are described. An integrated circuit includes a load store unit configured to receive load or store micro-operations cracked from a vector load or store operation, determine that a mask vector for the vector load or store micro-operation is fully inactive, and process the vector load or store micro-operation as a no-operation. If the mask vector is not fully inactive, the vector load or store micro-operation is unrolled into vector load or store sub-micro-operation(s) which have active mask element(s). Vector load or store sub-micro-operation(s) which have inactive mask element(s) are ignored.

20 Claims, 7 Drawing Sheets

PROCESSING FOR VECTOR LOAD OR STORE MICRO-OPERATION WITH INACTIVE MASK ELEMENTS

CROSS-REFERENCE TO RELATED APPLICATION

This application claims the benefit of priority to U.S. Provisional Patent Application Ser. No. 63/435,588 filed Dec. 28, 2022, and entitled "Processing For Vector Load Or Store Micro-operation With Inactive Mask Elements", the entire disclosures of which is hereby incorporated by reference.

TECHNICAL FIELD

This disclosure relates generally to integrated circuits and, more specifically, processing of vector load and store micro-operations with mask information.

BACKGROUND

A central processing unit (CPU) or processor core may be implemented according to a particular microarchitecture. As used herein, a "microarchitecture" refers to the way an instruction set architecture (ISA) (e.g., the RISC-V instruction set) is implemented by a processor core. A microarchitecture may be implemented by various components, such as decode units, rename units, dispatch units, execution units, registers, caches, queues, data paths, and/or other logic associated with instruction flow. A processor core may execute instructions in a pipeline based on the microarchitecture that is implemented.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
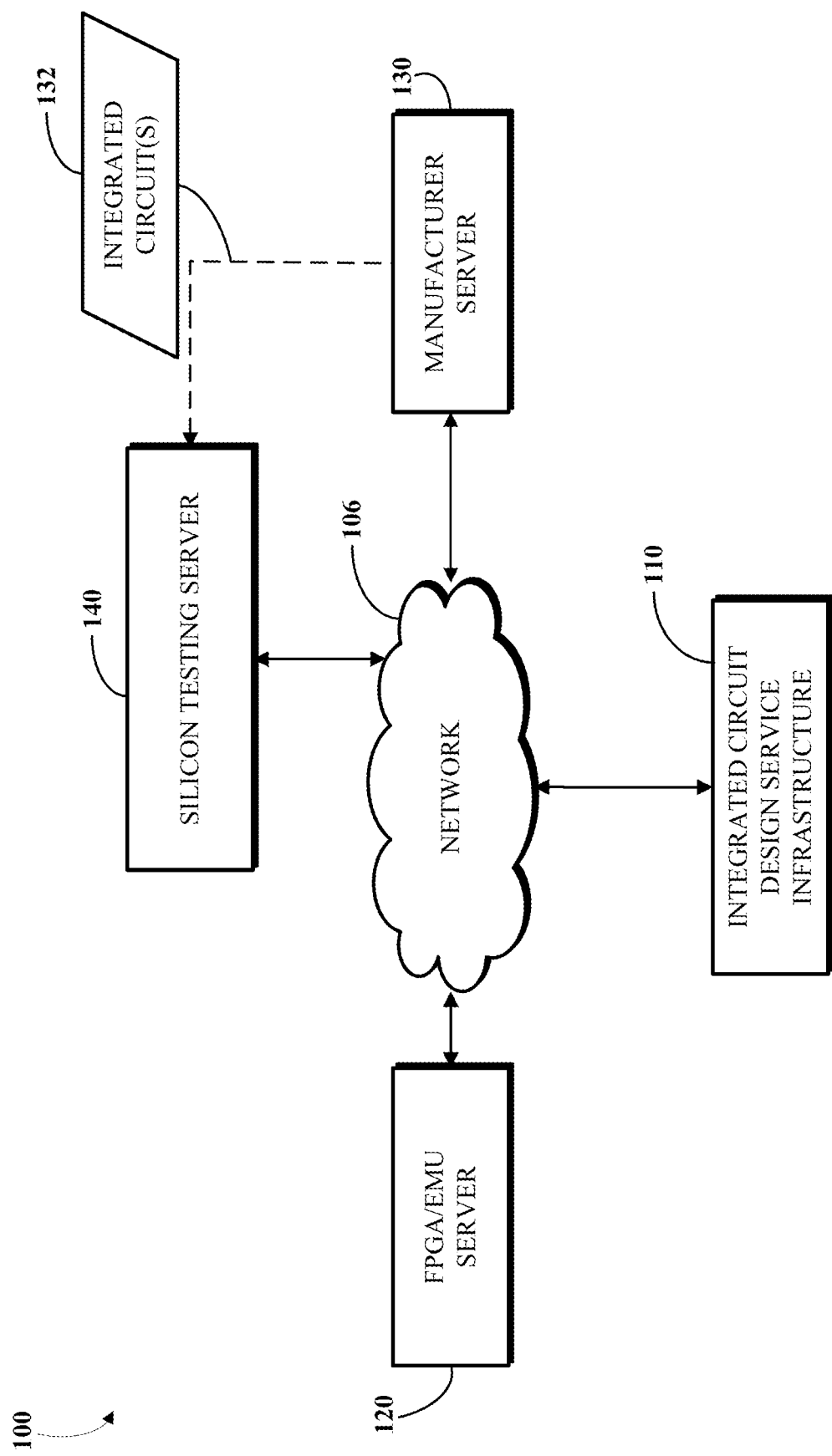
FIG. 1 is a block diagram of an example of a system for facilitating generation and manufacture of integrated circuits.

A processor or processor core may execute instructions in a pipeline based on the microarchitecture that is implemented. The pipeline may be implemented by various components, such as decode units, rename units, dispatch units, execution units, registers, caches, queues, data paths, and/or other logic associated with instruction flow. The processor may execute instructions out-of-order or be an on out-of-order processor. In implementations, the instruction may be a vector load or store instruction with mask information. The vector load or store instruction may be cracked into one or more vector load or store micro-operations. A dispatch unit in the processor may dispatch the one or more vector load or store micro-operations to a load/store unit (LSU) and a Baler. The Baler may process control sequencing and the mask information for the one or more vector load or store micro-operations so that the LSU can, in turn, process the one or more vector load or store micro-operations. The mask information may include a mask vector and a mask index. For the vector load or store micro-operation, the mask vector is applied to data read via a memory access for a vector load micro-operation or the mask vector is applied to data to be written or stored via a memory access for a vector store micro-operation. In some instances, a mask vector may indicate that all or some mask elements are low or inactive. In this instance, application of the mask to the data has no effect visible from the perspective of the processor. That is, performing the memory access is inefficient in terms of processing, performance, power management, and the like. Therefore, a mechanism is needed to prevent unnecessary memory accesses and associated processing in the event that a vector load or store micro-operation has a full or partial inactive mask vector.

Described are methods and circuitry which facilitates processing of a vector load or store micro-operation with mask information as a no-operation (no-op) when a mask vector for the vector load or store micro-operation has all inactive mask elements or processes vector load or store sub-micro-operation(s) with active mask element(s). That is, the mask vector has one or more mask elements which are set to low or inactive. In implementations, the LSU may determine from mask information processed or provided by a Baler, whether a mask vector has all mask elements set to inactive. In the event of a fully inactive mask vector, the LSU may process the vector load or store micro-operation as a no-operation (no-op) through appropriate pipelines until completion. The vector load or store micro-operation can then be retired. In the event one or more mask elements are active, the LSU may unroll the vector load or store micro-operation into vector load or store sub-micro-operation(s) which have active mask elements. The vector load or store sub-micro-operation(s) with inactive mask element(s) are ignored or not processed, i.e., a do not care status. That is, only vector load or store sub-micro-operation(s) with active mask elements are processed. The LSU may process the vector load or store sub-micro-operation(s) with active mask elements as is or normally through appropriate pipelines until completion. The vector load or store micro-operation can be retired upon completion of all the vector load or store sub-micro-operation(s). In implementations, a vector address generation unit in the LSU may determine whether the masked vector is fully inactive. In implementations, a vector address generation unit in the LSU may unroll active vector load or store sub-micro-operation(s). In implementations, the LSU and/or the vector address generation unit may perform the mask element determination prior to memory access processing for the vector load or store micro-operation. In implementations, the LSU and/or the vector address generation unit may perform the mask element determination prior to address generation. From a power perspective, this avoids logic toggling to access data which will not be used. From a performance perspective, this frees the LSU to make room for other instructions in the processor pipeline, hence improving the effective LS bandwidth.

To describe some implementations in greater detail, reference is first made to examples of hardware and software structures used to implement a system including components that may facilitate processing of a vector load or store micro-operation with mask information as a no-operation (no-op) when a mask vector for the vector load or store micro-operation has all inactive mask elements or processes vector load or store sub-micro-operation(s) with active mask element(s). FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3-4.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
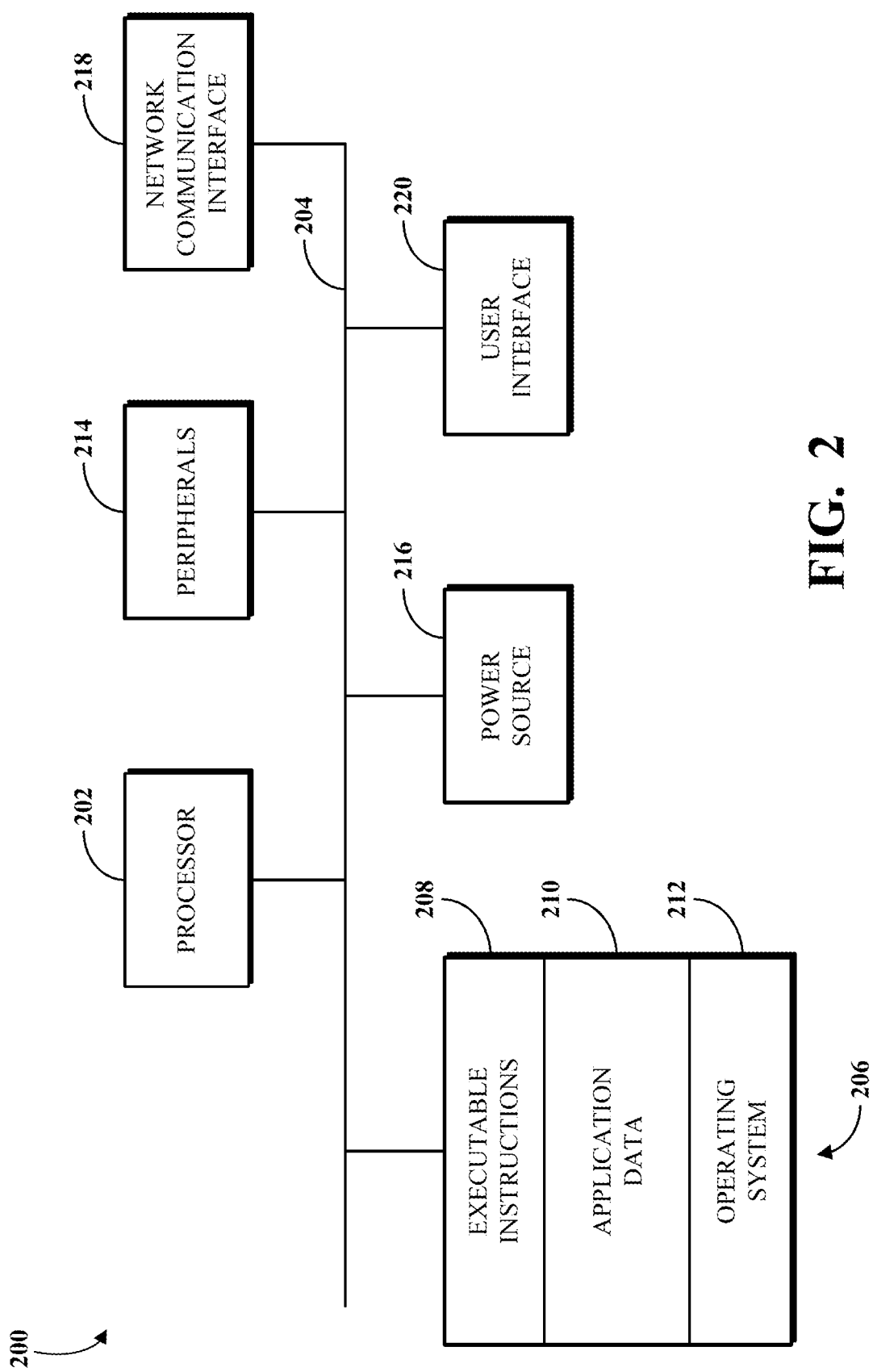
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3-4.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
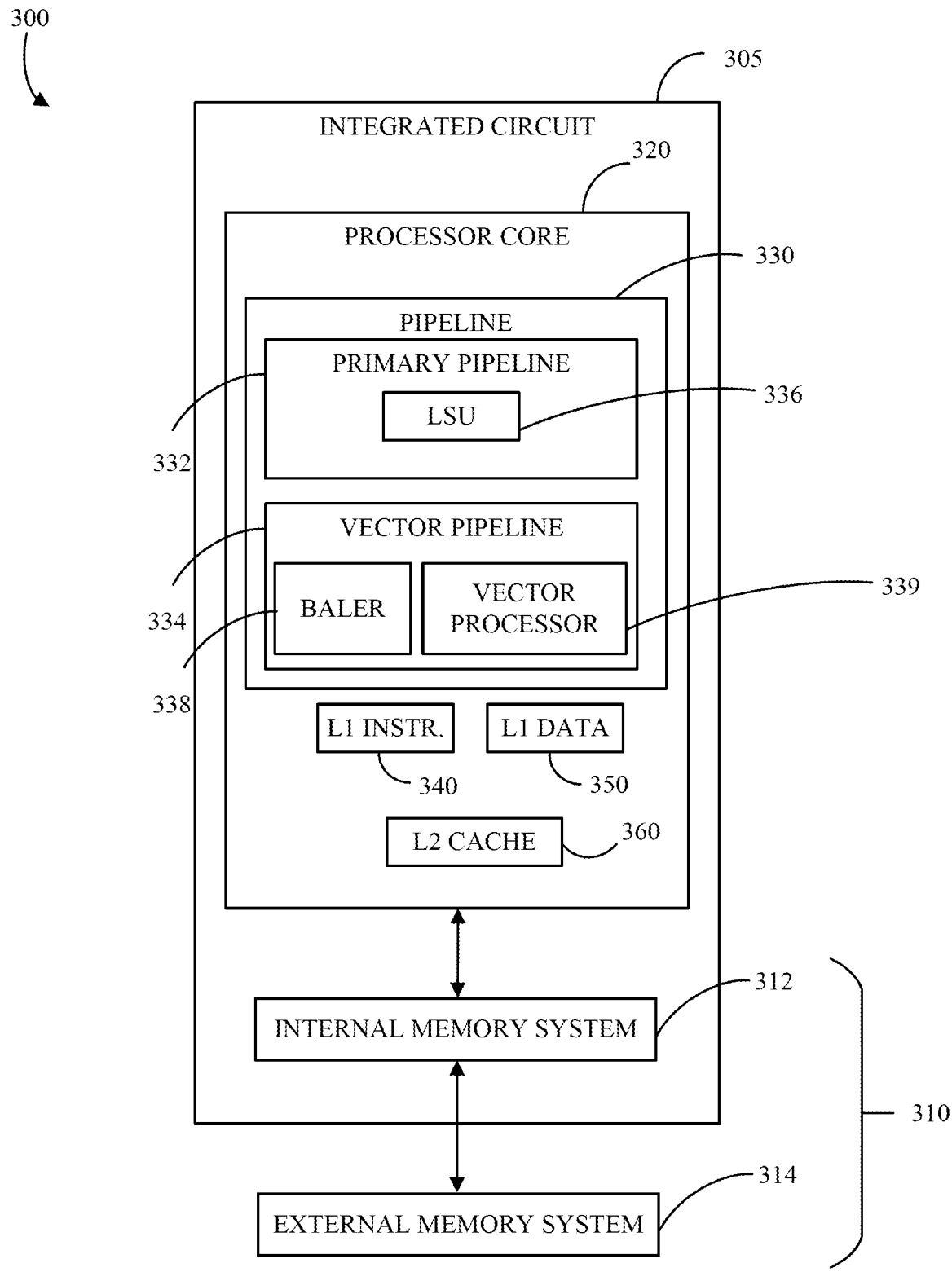
FIG. 3 is a block diagram of an example of an integrated circuit for tracking sub-micro-operation status and groups thereof.

FIG. 3 is a block diagram of an example of a system 300 including an integrated circuit 305 and a memory system 310. The integrated circuit 305 may include a processor core 320. The integrated circuit 305 could be implemented, for example, as a field-programmable gate array (FPGA), an application-specific integrated circuit (ASIC), or a system-on-chip (SoC). The memory system 310 may include an internal memory system 312 and an external memory system 314. The internal memory system 312 may be in communication with the external memory system 314. The internal memory system 312 may be internal to the integrated circuit 305 (e.g., implemented by the FPGA, the ASIC, or the SoC). The external memory system 314 may be external to integrated circuit 305 (e.g., not implemented by the FPGA, the ASIC, or the SoC). The internal memory system 312 may include, for example, a controller and memory, such as random access memory (RAM), static random access memory (SRAM), cache, and/or a cache controller, such as a level three (L3) cache and an L3 cache controller. The external memory system 314 may include, for example, a controller and memory, such as dynamic random access memory (DRAM) and a memory controller. In some implementations, the memory system 310 may include memory mapped inputs and outputs (MMIO), and may be connected to non-volatile memory, such as a disk drive, a solid-state drive, flash memory, and/or phase-change memory (PCM).

The processor core 320 may include circuitry for executing instructions, such as one or more pipelines 330, a level one (L1) instruction cache 340, an L1 data cache 350, and a level two (L2) cache 360 that may be a shared cache. The processor core 320 may fetch and execute instructions in the one or more pipelines 330, for example, as part of a program sequence. The instructions may cause memory requests (e.g., read requests and/or write requests) that the one or more pipelines 330 may transmit to the L1 instruction cache 340, the L1 data cache 350, and/or the L2 cache 360. Each of the one or more pipelines 330 may include a primary pipeline 332 and a vector pipeline 334. The primary pipeline 332 and the vector pipeline 334 may each have separate decode units, rename units, dispatch units, execution units, physical and/or virtual registers, caches, queues, data paths, and/or other logic associated with instruction flow. The primary pipeline 332 may include an LSU 336 as described herein. The vector pipeline 334 may include a baler 338 and a vector processor 339 as described herein. In some implementations, the primary pipeline 332 and the vector pipeline 334 may be out-of-order pipelines. The system 300 and each component in the system 300 is illustrative and can include additional, fewer, or different components which may be similarly or differently architected without departing from the scope of the specification and claims herein. Moreover, the illustrated components can perform other functions without departing from the scope of the specification and claims herein.

Figure 4:
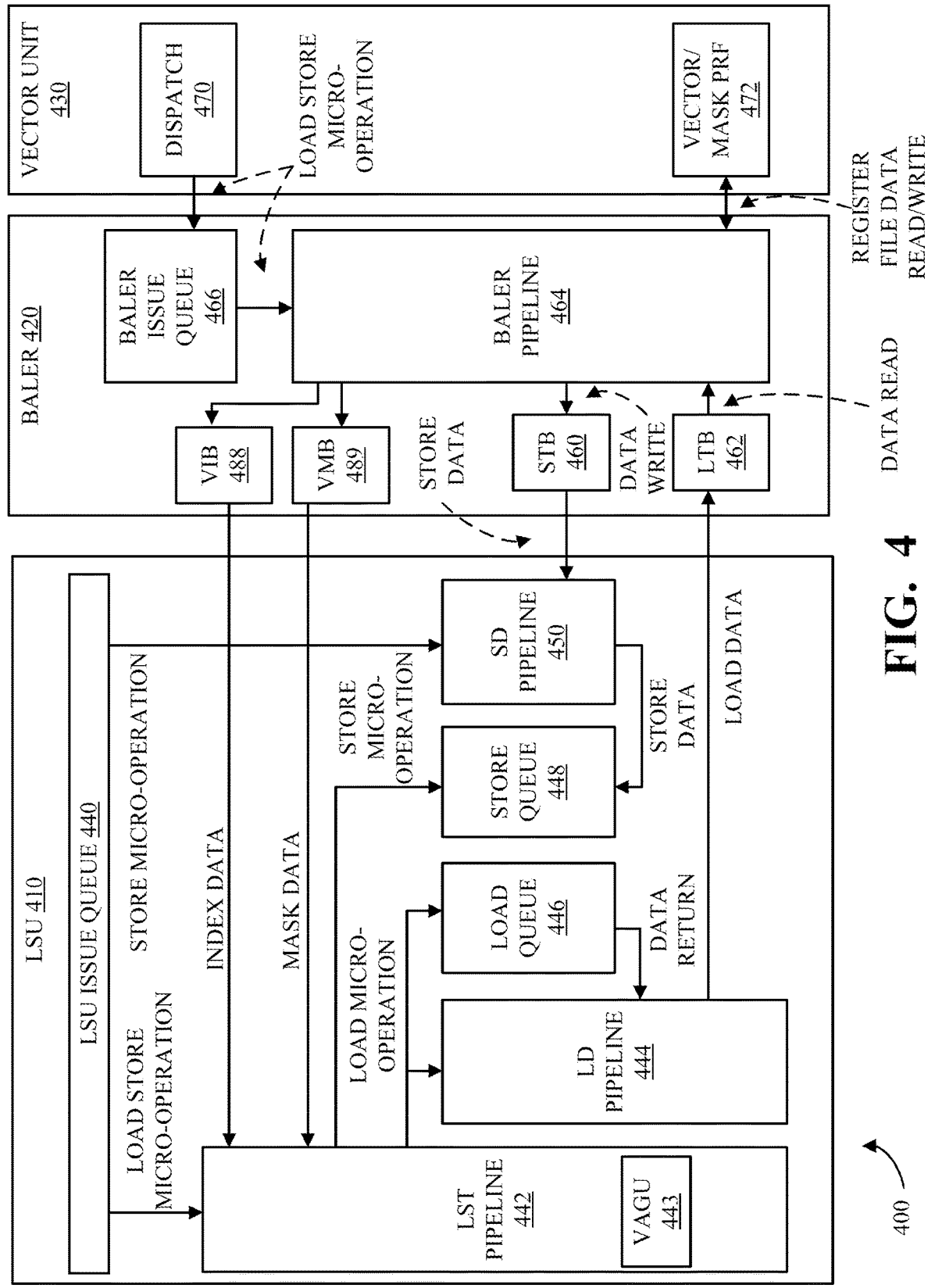
FIG. 4 is a block diagram illustrating a relationship between a load store unit (LSU), a Baler, and a Vector Unit or Processor (VU).

FIG. 4 is a block diagram of a processor or system 400 which illustrates processing flow between a load store unit (LSU) 410, a Baler 420, and a Vector Unit or Processor (VU) 430. The LSU 410 may include, but is not limited to, an LSU issue queue 440, a load store transfer (LST) pipeline 442, a load data (LD) pipeline 444, a load queue 446, a store queue 448, and a store data (SD) pipeline 450. The LST pipeline includes, but is not limited to, a vector address generation unit (VAGU) 443. The Baler 420 includes, but is not limited to, a store transfer buffer (STB) 460, a load transfer buffer (LTB) 462, a Baler pipeline 464, a Baler issue queue 466, a vector index buffer 488, and a vector mask buffer 489. The VU 430 includes, but is not limited to, a dispatch unit 470 and vector and mask physical register files (PRFs) 472. The processor 400 and each component in the processor 400 is illustrative and can include additional, fewer, or different components which may be similarly or differently architected without departing from the scope of the specification and claims herein. Moreover, the illustrated components can perform other functions without departing from the scope of the specification and claims herein.

The LSU 410 is responsible for handling memory access (reads and writes) for the processor 400 and maintaining the level 1 data cache.

The Baler 420 is the intermediate buffer between the LSU 410 and the VU 430. The Baler 420 buffers the load data from the LSU 410 and the store data from the VU 430. The tracking of data readiness is done in the Baler 420 to wake-up the LSU 410 or the VU 430 once the data is ready to be accessed.

The LTB 462 is the load buffer in the Baler 420 that handles the load data. Each entry in the LTB 462 stores VLEN-wide data read from memory, where VLEN is the vector register width in bits. For each non-segmented load element, the LTB 462 loads to the same place in an LTB entry (functionally similar to a vector register). For each segmented load element, the LTB 462 loads the segments in an in-memory format (segments of an element are placed sequentially).

The STB 460 is the store buffer in the Baler 420 that handles the store data. Each entry in the STB 460 stores VLEN-wide data read from the vector PRF 472. For each non-segmented store, the content in the vector PRF 472 is copied directly to the STB entry. For a segmented store, the STB 460 stores the segments in an in-memory format (segments of an element are placed sequentially).

The dispatch unit 470 in the VU 430 may crack load and/or store instructions and dispatch load and/or store micro-operations for processing through the processor 400. The VU 430 may process load and/or store instructions in an out-of-order manner.

The LSU issue queue 440 is a queue which stores dispatched micro-operations prior to issuing the micro-operations to one or more of the execution pipelines. The one or more of the execution pipelines may include, but is not limited to, the LST pipeline 442, the LD pipeline 444, and the SD pipeline 450. The LSU issue queue 440 checks the issue dependency of the micro-operation before issuing the micro-operation, including but not limited to, source readiness, ordering, sub-micro-operations tracking, and micro-operations replay handling.

The LST pipeline 442 is responsible for address generation via the VAGU 443 and establishment of entries in the load queue 446 and the store queue 448.

The SD pipeline 450 is responsible for acquiring data for store micro-operations and puts the data to the store queue 448. The store queue 448 stores the data that is waiting for write back to memory.

The LD pipeline 444 is responsible for reading or loading data for load micro-operations.

Operationally, the LSU 410 and the VU 430 may receive vector load or store micro-operations, which are cracked from a vector load or store instruction with mask information. The mask information may include a mask index and a mask vector. The VU 430 may dispatch the vector load or store micro-operations to the Baler issue queue 466. The Baler pipeline 464 may process the vector load or store micro-operations as issued by the Baler issue queue 466. The Baler issue queue 466 and/or the Baler pipeline 464 may sequence the number of vector load or store micro-operations needed to handle control of the STB 460, the LTB 462, the VIB 488, and the VMB 489, as appropriate and applicable. The Baler pipeline 464 may load the mask index and the mask element status from the mask vector, i.e., active/inactive, high/low, I/O, of each mask element into the VIB 488, and the VMB 489, respectively, as appropriate and applicable.

The LST pipeline 442 may read data from the VIB 488 and the VMB 489 to mask the load and/or store data accordingly. The data in the VIB 488 and the VMB 489 indicates an active or inactive status for each mask element as associated with a data element in the data. The VAGU 443 may determine whether all mask elements for a vector load or store micro-operation are inactive. In the event that all mask elements are inactive, i.e., fully masked inactive, the VAGU 443 may treat the vector load or store micro-operation as a no-operation for purposes of execution through appropriate ones of the LD pipeline 444, the SD pipeline 450, the load queue 446, and the store queue 448. That is, the VAGU 443 may process the vector load or store micro-operation as a no-operation. In this instance, the LSU 410, the LST pipeline 442, and/or the VAGU 443 does not unroll the vector load or store micro-operation. In implementations, the VAGU 443 and/or other components in the LSU 410 may modify appropriate portions or fields of the vector load or store micro-operation to be a no-operation. This may include, but is not limited to, modification of an operand, source, destination, and/or other fields. The vector load or store micro-operation operation as a no-operation may then be processed through the appropriate ones of the LD pipeline 444, the SD pipeline 450, the load queue 446, the store queue 448, and/or other components, such as execution units. Completion of the vector load or store micro-operation as a no-operation results in retirement of the vector load or store micro-operation and/or instruction, as appropriate or applicable.

In the event that one or more mask elements are active, the LSU 410, the LST pipeline 442, and/or the VAGU 443 may split or unroll the vector load or store micro-operations into vector load or store sub-micro-operations (sub-micro-operations) which have active mask elements in order for the LSU 410, the LST pipeline 442, and/or the VAGU 443 to generate the number of accesses (memory accesses) required to fetch the data from a memory subsystem and fill the LTB 462 or request the data from the STB 460 and write the level 1 data cache, as appropriate and applicable. For example, assume a store instruction with LMUL=8. The store instruction is cracked into 8 micro-operations (MO) and each MO is unrolled into X sub-MOs, where LMUL is the vector group size. That is, LMUL specifies the number of vector registers that are grouped for an instruction. Assume the vector store includes no mask information (i.e., no mask vector). The vector store can be unrolled into 8 sub-micro-operations. If the same vector store now includes a mask vector where only even numbered sub-micro-operations contains active mask elements, then the LSU 410, the LST pipeline 442, and/or the VAGU 443 may split or unroll only even numbered store sub-micro-operations. Later pipelines will only see the active sub-micro-operations and will not see the inactive, not unrolled store sub-micro-operations. That is, the inactive, not unrolled store sub-micro-operations are ignored. For mask elements which are active, the VAGU 443 may execute the vector load or store sub-micro-operations as normal through appropriate ones of the LD pipeline 444, the SD pipeline 450, the load queue 446, and the store queue 448. Completion of the active vector load or store sub-micro-operation may result in retirement of the vector load or store micro-operation and/or instruction, as appropriate or applicable.

Figure 5:
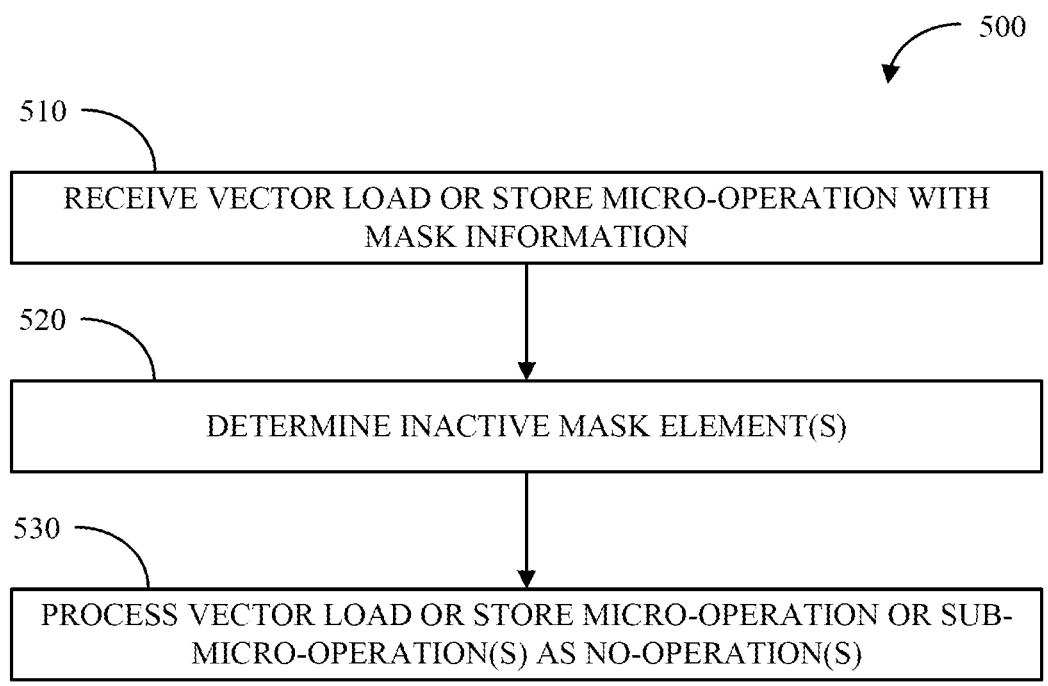
FIG. 5 is a flow chart of a method for processing a vector load or store instruction, micro-operation, and/or sub-micro-operation.

FIG. 5 is a flow chart of a method 500 for processing of a vector load or store micro-operation with mask information as a no-operation (no-op) when a mask vector for the vector load or store micro-operation has all inactive mask elements or processes vector load or store sub-micro-operation(s) with active mask element(s). The method 500 may include: receiving 510 a vector load or store micro-operation with mask information; determining 520 inactive mask elements; and processing 530 the vector load or store micro-operation as a no-operation for a fully inactive mask or process vector load or store sub-micro-operation(s) with active mask element(s). The method 500 may be performed in the system 100 of FIG. 1, the system 200 of FIG. 2, the system 300 of FIG. 3, and/or the LSU 400 of FIG. 4.

The method 500 may include receiving 510 a vector load or store micro-operation with mask information. An LSU and Baler may receive the vector load or store micro-operation with mask information from a dispatch unit in a processor. The Baler may load mask information, including mask index and mask vector, into appropriate buffers for access by the LSU.

The method 500 may include determining 520 inactive mask elements. An LSU and/or VAGU may determine that one or more mask elements in the mask vector are inactive. That is, no action is to be taken with respect to the data due to an inactive status of the mask element. This determination may be done prior to unrolling of the vector load or store micro-operation.

The method 500 may include processing 530 the vector load or store micro-operation as a no-operation for a fully inactive mask or process vector load or store sub-micro-operation(s) with active mask element(s). In the event that the mask vector is fully inactive or all mask elements are inactive, the vector load or store micro-operation is executed as a no-operation. Execution as a no-op may include modification of the vector load or store micro-operation or the vector load or store sub-micro-operation(s), as appropriate and applicable. The no-operation execution may be done prior to unrolling of the vector load or store micro-operation. In the event one or more of the mask elements are active, the LSU and/or VAGU may unroll the vector load or store sub-micro-operation(s) having active mask element(s). The active vector load or store sub-micro-operation(s) are processed as normal. For the inactive mask element(s), the LSU and/or VAGU may ignore the vector load or store sub-micro-operation.

Figure 6:
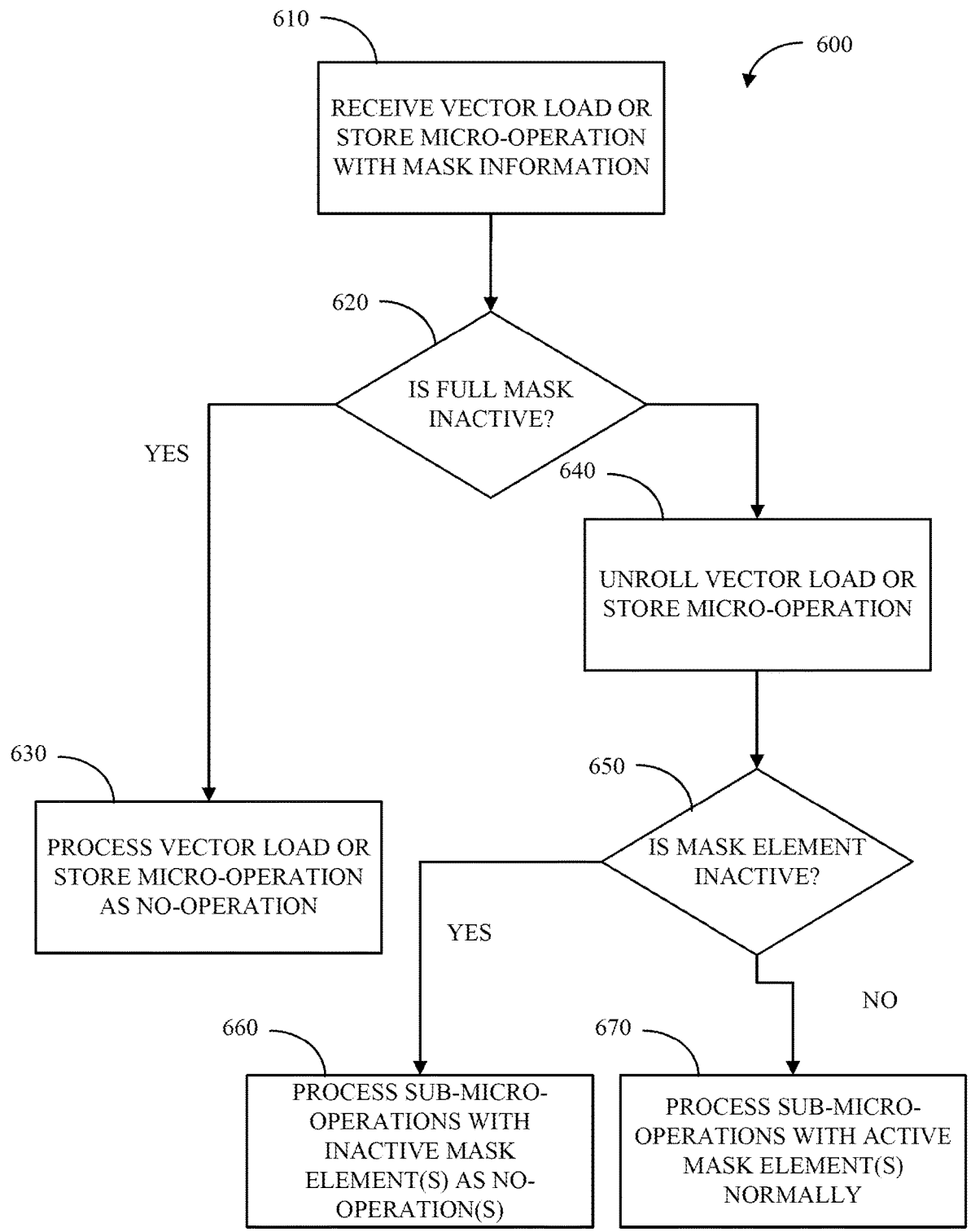
FIG. 6 is a flow chart of a method for processing a vector load or store instruction, micro-operation, and/or sub-micro-operation.

FIG. 6 is a flow chart of a method 600 for processing of a vector load or store micro-operation with mask information as a no-operation (no-op) when a mask vector for the vector load or store micro-operation has all inactive mask elements or processes vector load or store sub-micro-operation(s) with active mask element(s). The method 600 may include: receiving 610 a vector load or store micro-operation with mask information; determining 620 whether a mask vector for the vector load or store micro-operation is fully inactive; processing 630 the vector load or store micro-operation as a no-operation if fully inactive; unrolling 640 the vector load or store micro-operation into vector load or store sub-micro-operation(s) which have active mask element(s); and processing 650 active vector load or store sub-micro-operation(s) as is or normal. The method 600 may be performed in the system 100 of FIG. 1, the system 200 of FIG. 2, the system 300 of FIG. 3, and/or the LSU 400 of FIG. 4.

The method 600 may include receiving 610 a vector load or store micro-operation with mask information. An LSU and Baler may receive the vector load or store micro-operation with mask information from a dispatch unit in a processor. The Baler may load mask information, including mask index and mask vector, into appropriate buffers for access by the LSU.

The method 600 may include determining 620 whether a mask vector for the vector load or store micro-operation is fully inactive. An LSU and/or VAGU may determine whether the mask elements in the mask vector are fully inactive. That is, determining whether no action is to be taken with respect to the data due to the inactive status of the mask elements. This determination may be done prior to unrolling of the vector load or store micro-operation.

The method 600 may include processing 630 the vector load or store micro-operation as a no-operation if fully inactive. The LSU and/or VAGU treats or processes the vector load or store micro-operation as a no-operation. This may include modification of the vector load or store micro-operation as appropriate and applicable to execute as a no-operation. The no-operation execution may be done prior to unrolling of the vector load or store micro-operation.

The method 600 may include unrolling 640 the vector load or store micro-operation into vector load or store sub-micro-operation(s) which have active mask element(s). The vector load or store micro-operation may be unrolled into vector load or store sub-micro-operations which have active mask element(s). Vector load or store sub-micro-operations associated with inactive mask element(s) are ignored and/or not processed.

The method 600 may include processing 650 active vector load or store sub-micro-operation(s) as is or normal. The LSU and/or VAGU may process vector load or store sub-micro-operation(s) as is or normal if a mask element in the mask vector is active.

Figure 7:
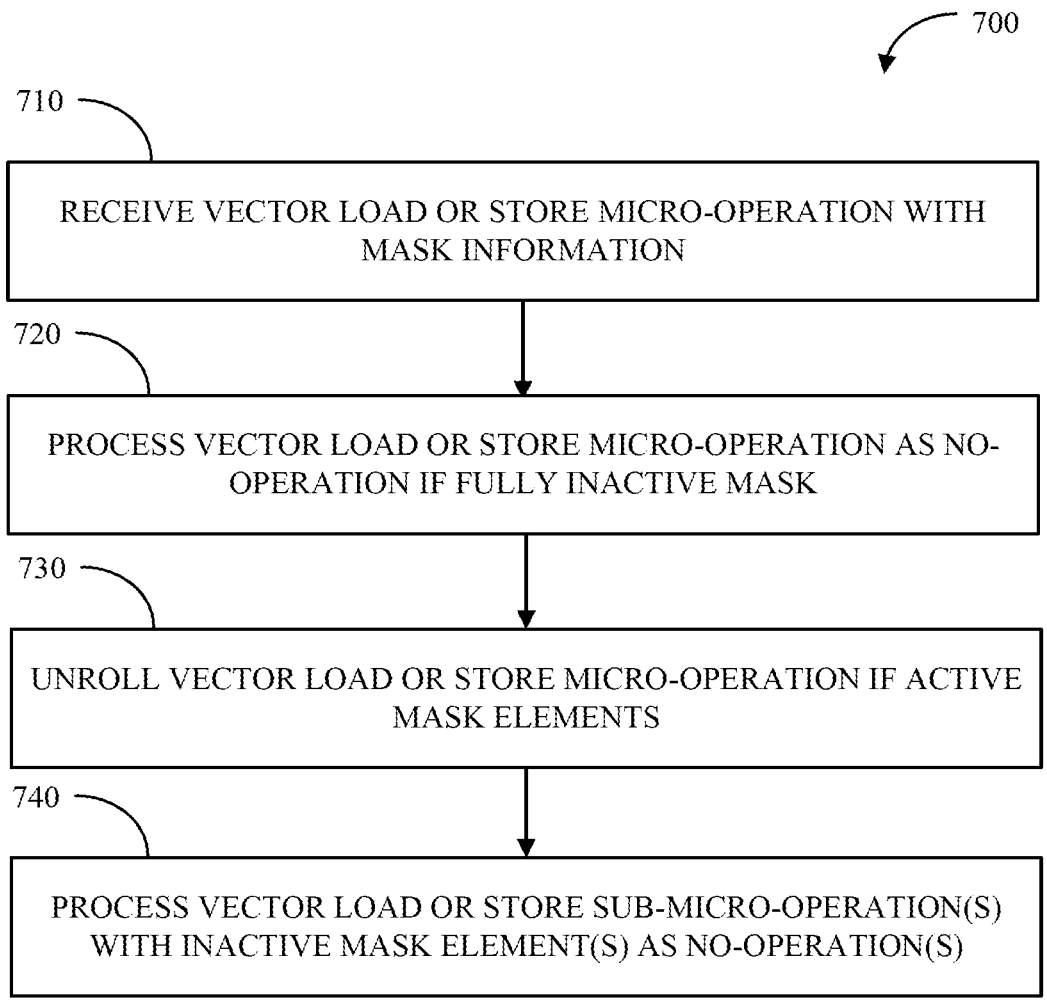
FIG. 7 is a flow chart of a method for processing a vector load or store instruction, micro-operation, and/or sub-micro-operation.

FIG. 7 is a flow chart of a method 700 for processing of a vector load or store micro-operation with mask information as a no-operation (no-op) when a mask vector for the vector load or store micro-operation has all inactive mask elements or processing vector load or store sub-micro-operation(s) with active mask element(s). The method 700 may include: receiving 710 a vector load or store micro-operation with mask information; processing 720 the vector load or store micro-operation as a no-operation if fully inactive mask; and ignoring 740 vector load or store sub-micro-operation(s) with inactive mask element(s). The method 700 may be performed in the system 100 of FIG. 1, the system 200 of FIG. 2, the system 300 of FIG. 3, and/or the LSU 400 of FIG. 4.

The method 700 may include receiving 710 a vector load or store micro-operation with mask information. An LSU and Baler may receive the vector load or store micro-operation with mask information from a dispatch unit in a processor. The Baler may load mask information, including mask index and mask vector, into appropriate buffers for access by the LSU.

The method 700 may include processing 720 the vector load or store micro-operation as a no-operation if fully inactive mask. An LSU and/or VAGU may determine that all mask elements in the mask vector are fully inactive. That is, no action is to be taken with respect to the data due to the inactive status of the mask elements. In the event all of the mask elements are inactive, the LSU and/or VAGU may treat or process the vector load or store micro-operation as a no-operation. Execution as a no-op may include modification of the vector load or store micro-operation, as appropriate and applicable. The fully inactive determination and no-operation execution may be done prior to unrolling of the vector load or store micro-operation.

The method 700 may include ignoring 740 vector load or store sub-micro-operation(s) with inactive mask element(s) when not fully inactive. The LSU and/or VAGU may unroll the vector load or store micro-operation into vector load or store sub-micro-operations which have active mask element(s). The active vector load or store sub-micro-operations are processed as is or normally.

In an implementation, an integrated circuit includes a load store unit configured to receive load or store micro-operations cracked from a vector load or store operation, determine that a mask vector for the vector load or store micro-operation is fully inactive, and process the vector load or store micro-operation as a no-operation for a fully inactive mask vector.

In implementations, the load store unit further configured to modify the vector load or store micro-operation to execute as the no-operation. In implementations, modification of the vector load or store micro-operation includes modification of at least one of an operand, source, or destination of the vector load or store micro-operation. In implementations, the load store unit further configured to unroll each load or store micro-operation into multiple sub-micro-operations which have mask elements in the mask vector that are active. In implementations, the load store unit further configured to process an active vector load or store sub-micro-operation as normal. In implementations, the load store unit further configured to ignore an inactive vector load or store sub-micro-operation. In implementations, the integrated circuit further including a Baler configured to receive load or store micro-operations cracked from the vector load or store operation and load at least the mask vector for access by the load store unit.

In an implementation, a method including receiving, at a load store unit, a vector load or store micro-operation, determining, by the load store unit, that a mask vector for the vector load or store micro-operation is fully inactive, and processing, by the load store unit, the vector load or store micro-operation as a no-operation for a fully inactive mask vector.

In implementations, the method further including modifying, by the load store unit, the vector load or store micro-operation to execute as the no-operation. In implementations, the modifying further including modifying, by the load store unit, at least one of an operand, source, or destination of the vector load or store micro-operation. In implementations, the method further including unrolling, by the load store unit, each load or store micro-operation into multiple sub-micro-operations which have mask elements in the mask vector that are active. In implementations, the method further including processing, by the load store unit, an active vector load or store sub-micro-operation as normal. In implementations, the method further including ignoring, by the load store unit, an inactive vector load or store sub-micro-operation. In implementations, the method further including receiving, at a Baler unit, the vector load or store micro-operation, and loading, by the Baler unit, at least the mask vector for access by the load store unit.

In an implementation, a non-transitory computer readable medium comprising a circuit representation that, when processed by a computer, is used to program or manufacture an integrated circuit including a load store unit configured to receive load or store micro-operations cracked from a vector load or store operation, determine that a mask vector for the vector load or store micro-operation is fully inactive, and process the vector load or store micro-operation as a no-operation for a fully inactive mask vector.

In implementations, the load store unit further configured to modify the vector load or store micro-operation to execute as the no-operation. In implementations, modification of the vector load or store micro-operation includes modification of at least one of an operand, source, or destination of the vector load or store micro-operation. In implementations, the load store unit further configured to unroll each load or store micro-operation into multiple sub-micro-operations which have mask elements in the mask vector that are active, and process an active vector load or store sub-micro-operation as normal. In implementations, the load store unit further configured to ignore an inactive vector load or store sub-micro-operation. In implementations, the integrated circuit further including a Baler configured to receive load or store micro-operations cracked from the vector load or store operation and load at least the mask vector for access by the load store unit.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit comprising:
   a load store unit configured to:
     receive load or store micro-operations cracked from a vector load or store operation;
     determine that a mask vector for the vector load or store micro-operation is fully inactive; and
     process the vector load or store micro-operation as a no-operation for a fully inactive mask vector.

2. The integrated circuit of claim 1, the load store unit further configured to:
   modify the vector load or store micro-operation to execute as the no-operation.

3. The integrated circuit of claim 2, wherein modification of the vector load or store micro-operation includes modification of at least one of an operand, source, or destination of the vector load or store micro-operation.

4. The integrated circuit of claim 1, the load store unit further configured to:
   unroll each load or store micro-operation into multiple sub-micro-operations which have mask elements in the mask vector that are active.

5. The integrated circuit of claim 4, the load store unit further configured to:
   process an active vector load or store sub-micro-operation as normal.

6. The integrated circuit of claim 5, the load store unit further configured to:
   ignore an inactive vector load or store sub-micro-operation.

7. The integrated circuit of claim 6, further comprising:
   a Baler configured to receive load or store micro-operations cracked from the vector load or store operation and load at least the mask vector for access by the load store unit.

8. A method comprising:
   receiving, at a load store unit, a vector load or store micro-operation;
   determining, by the load store unit, that a mask vector for the vector load or store micro-operation is fully inactive; and
   processing, by the load store unit, the vector load or store micro-operation as a no-operation for a fully inactive mask vector.

9. The method of claim 8, further comprising:
   modifying, by the load store unit, the vector load or store micro-operation to execute as the no-operation.

10. The method of claim 9, the modifying further comprising:
    modifying, by the load store unit, at least one of an operand, source, or destination of the vector load or store micro-operation.

11. The method of claim 9, further comprising:
    unrolling, by the load store unit, each load or store micro-operation into multiple sub-micro-operations which have mask elements in the mask vector that are active.

12. The method of claim 11, further comprising:
    processing, by the load store unit, an active vector load or store sub-micro-operation as normal.

13. The method of claim 12, further comprising:
    ignoring, by the load store unit, an inactive vector load or store sub-micro-operation.

14. The method of claim 13, further comprising:
- receiving, at a Baler unit, the vector load or store micro-operation; and
- loading, by the Baler unit, at least the mask vector for access by the load store unit.

15. A non-transitory computer readable medium comprising a circuit representation that, when processed by a computer, is used to program or manufacture an integrated circuit comprising:
- a load store unit configured to:
  - receive load or store micro-operations cracked from a vector load or store operation;
  - determine that a mask vector for the vector load or store micro-operation is fully inactive; and
  - process the vector load or store micro-operation as a no-operation for a fully inactive mask vector.

16. The non-transitory computer readable medium of claim 15, wherein the circuit representation when processed by the computer is further used to program or manufacture the load store unit such that the load store unit is further configured to:
- modify the vector load or store micro-operation to execute as the no-operation.

17. The non-transitory computer readable medium of claim 16, wherein modification of the vector load or store micro-operation includes modification of at least one of an operand, source, or destination of the vector load or store micro-operation.

18. The non-transitory computer readable medium of claim 15, wherein the circuit representation when processed by the computer is further used to program or manufacture the load store unit such that the load store unit is further configured to:
- unroll each load or store micro-operation into multiple sub-micro-operations which have mask elements in the mask vector that are active; and
- process an active vector load or store sub-micro-operation as normal.

19. The non-transitory computer readable medium of claim 15, wherein the circuit representation when processed by the computer is further used to program or manufacture the load store unit such that the load store unit is further configured to:
- ignore an inactive vector load or store sub-micro-operation.

20. The non-transitory computer readable medium of claim 15, wherein the circuit representation when processed by the computer is further used to program or manufacture the integrate circuit such that the integrated circuit further comprises:
- a Baler configured to receive load or store micro-operations cracked from the vector load or store operation and load at least the mask vector for access by the load store unit.

* * * * *